United States Patent [19]

Kato

[11] Patent Number: 4,503,531
[45] Date of Patent: Mar. 5, 1985

[54] OPTICAL DISC

[75] Inventor: Hiroshi Kato, Saitama, Japan

[73] Assignee: Pioneer Electronic Corporation, Tokyo, Japan

[21] Appl. No.: 447,853

[22] Filed: Dec. 8, 1982

[30] Foreign Application Priority Data

Dec. 22, 1981 [JP] Japan ............................ 56-206078

[51] Int. Cl.³ .............................................. G11B 7/24
[52] U.S. Cl. .................................... 369/275; 358/342; 369/284; 369/286; 428/497; 428/523
[58] Field of Search ............... 369/109, 275, 288, 286, 369/284; 358/342; 428/411, 416, 579, 64; 346/76 L

[56] References Cited

U.S. PATENT DOCUMENTS 4,188,433 2/1980 Dijkstra et al. .................... 369/275

FOREIGN PATENT DOCUMENTS 50337 3/1982 Japan .................................. 369/275

Primary Examiner—Robert L. Richardson
Attorney, Agent, or Firm—Sughrue, Mion, Zinn, Macpeak, and Seas

[57] ABSTRACT

An optical disc includes a pair of substrates, at least one of which has predetermined information pits formed on one surface. The two substrates are bonded with a hot-melt adhesive having (1) a softening point of not more than 140° C., (2) a dry tensile adhesive strength of not less than 1 kg/cm² at 20° C. and (3) a melt viscosity of not more than 1,000 P at 160° C.

7 Claims, 3 Drawing Figures

OPTICAL DISC

BACKGROUND OF THE INVENTION

The present invention relates to an optical disc made of two laminated substrates, and which is generally referred to as an optical video disc or digital audio disc.

A cross section of a conventional optical disc is shown in FIG. 1 wherein a synthetic resin (e.g. acrylic resin) substrate 1 with information pits 1a formed on one side thereof is covered with a metallic (e.g. aluminum) reflecting film 2. The film 2 is further protected with an adhesive layer 3, and the substrate is laminated in face-to-face relation with another substrate 1' also having information pits 1a', a metallic reflecting film 2' and a protective adhesive layer 3'. Usually, the two substrates are bonded together with an epoxy or solvent type adhesive. However, epoxy adhesive cures slowly at ordinary temperatures, and furthermore, it entraps air and may have adverse effects on the vacuum-deposited metallic reflecting layer. On the other hand, the solvent type adhesive quite easily attacks the substrate if it is made of an acrylic resin.

SUMMARY OF THE INVENTION

Therefore, an object of the present invention is to provide an optical disc wherein two substrates are bonded by an adhesive which does not attack the vapor-deposited metallic film or the substrate resin. Because of this feature, the disc is made capable of storing recorded information with high accuracy.

This object can be achieved by bonding a pair of substrates with a hot-melt adhesive having the following characteristics:
(1) a softening point of not more than 140° C.;
(2) a dry tensile adhesion strength of not less than 1 kg/cm$^2$ at 20° C.; and
(3) a melt viscosity of not more than 1,000 P at 160° C.

DETAILED DESCRIPTION OF THE PREFERRED EMBODIMENTS

Figure 1:
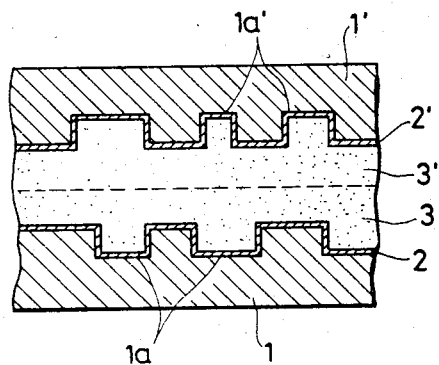
FIG. 1 is a cross section of an optical disc wherein two substrates are bonded by a conventional adhesive.

The hot-melt adhesive of the present invention has as its base polymer a mixture of one or more block thermoplastic elastomers of the formula A-B-A, or B-A-B (wherein A is a polystyrene polymer block having a molecular weight of 2,000 to 12,500, and B is a polybutadiene or polyisoprene block or an ethylene-butylene copolymer block having a molecular weight of 1,000 to 250,000) or a blend of such mixture with another synthetic rubber, or olefin homopolymer or copolymer. The desired characteristics of the adhesive are obtained by mixing 100 parts by weight of this base polymer with 100 to 600 parts by weight of a tackifier and 0 to 100 parts by weight of a softener.

The block thermoplastic elastomer used as the base polymer is commercially available from Shell Chemical Co. under the trade names Califlex TR-1101, TR-1102, TR-1107, TR-111, TR-1112, TR-1184, TR-4113, TR-4122, TR-4140, TR-4203, TR-4205, and Clayton G-1650, G-1651, G-1652 and G-1657, as well as from Asahi Chemical Industry Co., Ltd. under the trade names Solprene 411, Toughprene A and Asaprene 413. Illustrative synthetic rubbers include polyisoprene, styrene rubber, butadiene rubber and butyl rubber. Illustrative olefin homopolymers are polyethylene and polypropylene, and an example of the olefin copolymer is ethylene-vinyl acetate copolymer. The synthetic rubbers and olefin homopolymers or copolymers can be incorporated in the block thermoplastic in an amount sufficient to provide the desired characteristics of the adhesive.

Examples of the tackifier include natural resins such as rosin and modified products thereof such as polymerized rosin, hydrogenated rosin and rosin esters, as well as aliphatic, alicyclic and aromatic petroleum resins, and terpene, phenolic and cumarone resins. Examples of the softener include process oil, paraffin oil, castor oil, polybutene and polyisoprene.

The hot-melt adhesive of the present invention may further contain an additive such as filler, anti-oxidant or UV absorber to increase its heat resistance and weatherability.

The softening point of the hot-melt adhesive of the present invention is set at a value not higher than 140° C. in consideration of both the heat resistance of transparent synthetic resins (e.g. acrylic resin and polycarbonate resin) of which the substrate is made and the adhesive strength at elevated temperatures. The dry tensile adhesive strength is set at a value not less than 1 kg/cm$^2$ at 20° C. in order to prevent the substrates from separating from one another when the disc deflects. The melt viscosity of the adhesive is set at a value not more than 1,000 P at 160° C. so that it will not cause adverse effects on the vapor-deposited metallic film. If these requirements are not met, signals recorded on the disc at a high density are adversely affected and when the disc deflects during handling one substrate will separate from the other.

In one preferred embodiment, the hot-melt adhesive of the present invention comprises 100 parts by weight of a polystyrene-polyisoprene block co-polymer as a base polymer (Califlex TR-1107 from Shell Chemical Co.). 200 parts by weight of an alicyclic petroleum resin as a tackifier (Alcone P-70 from Arakawa Forest Chemical Industries, Ltd.) and 150 parts by weight of an α-methylstyrene-vinyl toluene copolymer resin, also as a tackifier, (Picotex 75 from Hercules Incorporated.), 20 parts by weight of a naphthenic process oil, Shellflex 371 N (Shell Chemical Co.) as a softener and 10 parts by weight of Ilganox 1010 (Ciba-Geigy AG.) as an antioxidant.

Figure 2:
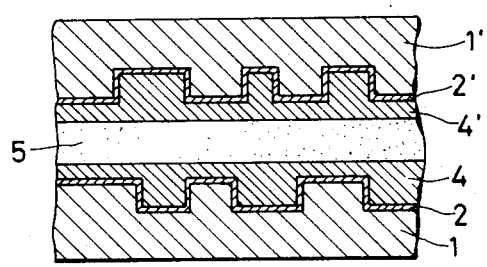
FIG. 2 is a cross section of an optical disc wherein two substrates, each having a resin protective layer, are bonded by the adhesive of the present invention.
Figure 3:
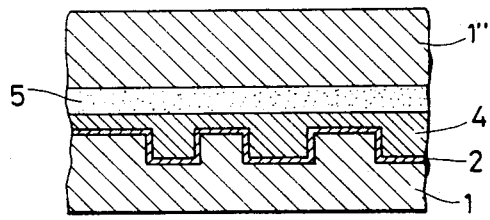
FIG. 3 is a cross section of an optical disc wherein one substrate having information pits is bonded to another having no such pits by the adhesive of the present invention.

FIG. 2 shows a typical embodiment of the optical disc of the present invention wherein two substrates 1 and 1' having resin protective layers 4 and 4' on metallic reflecting films 2 and are bonded by an adhesive layer 5 replacing the conventional adhesive/protective layers 3 and 3' shown in FIG. 1. FIG. 3 shows another embodiment wherein a substrate 1 having information pits is laminated with a substrate 1" having no such pits.

Furthermore, the conventional adhesive layers 3 and 3' of the optical disc as shown in FIG. 1 are replaceable by the adhesive layers of the present invention without attacking the vapor-deposited metallic film or the substrate resin.

As described in foregoing, the present invention provides an optical disc capable of high-precision storage of densely recorded signals without attacking the synthetic resin of which the substrates are made or the vapor-deposited metallic film. Since the adhesive for bonding the two substrates can be cured in a short period without evaporating solvents or water, the optical disc of the present invention can be manufactured in a shorter period of time and at a lower cost.

What is claimed is:

1. An optical disc, comprising: a pair of substrates, at least one of which having predetermined information pits formed on one surface, said two substrates being bonded with a hot-melt adhesive having (1) a softening point of not more than 140° C., (2) a dry tensile adhesive strength of not less than 1 kg/cm² at 20° C. and (3) a melt viscosity of not more than 1,000 P at 160° C.

2. An optical disc as claimed in claim 1, said adhesive having a base comprising a mixture of one or more block thermoplastic elastomers, and a tackifier.

3. An optical disc as claimed in claim 2, said tackifier being selected from among natural rosin, polymerized rosin, hydrogenated rosin, rosin esters, aliphatic, alicyclic and aromatic petroleum resins and terpene, phenolic and camarone resins.

4. An optical disc as claimed in claim 2, said adhesive further including a softener.

5. A laminated disc, comprising; at least a pair of substrates arranged in confronting relation, and an adhesive bonding said substrates, said adhesive being of a non-solvent type and including a base including at least one block thermoplastic elastomer and a tackifier.

6. A laminated disc as claimed in claim 5, said adhesive comprising a hot-melt adhesive having a melt viscosity of not more than 1,000 P at 160° C.

7. A laminated disc as claimed in claim 6, said adhesive further having a softening point of not more than 140° C. and a dry tensile adhesive strength of not less than 1 kg/cm² at 20° C.

* * * * *